Patented May 16, 1939

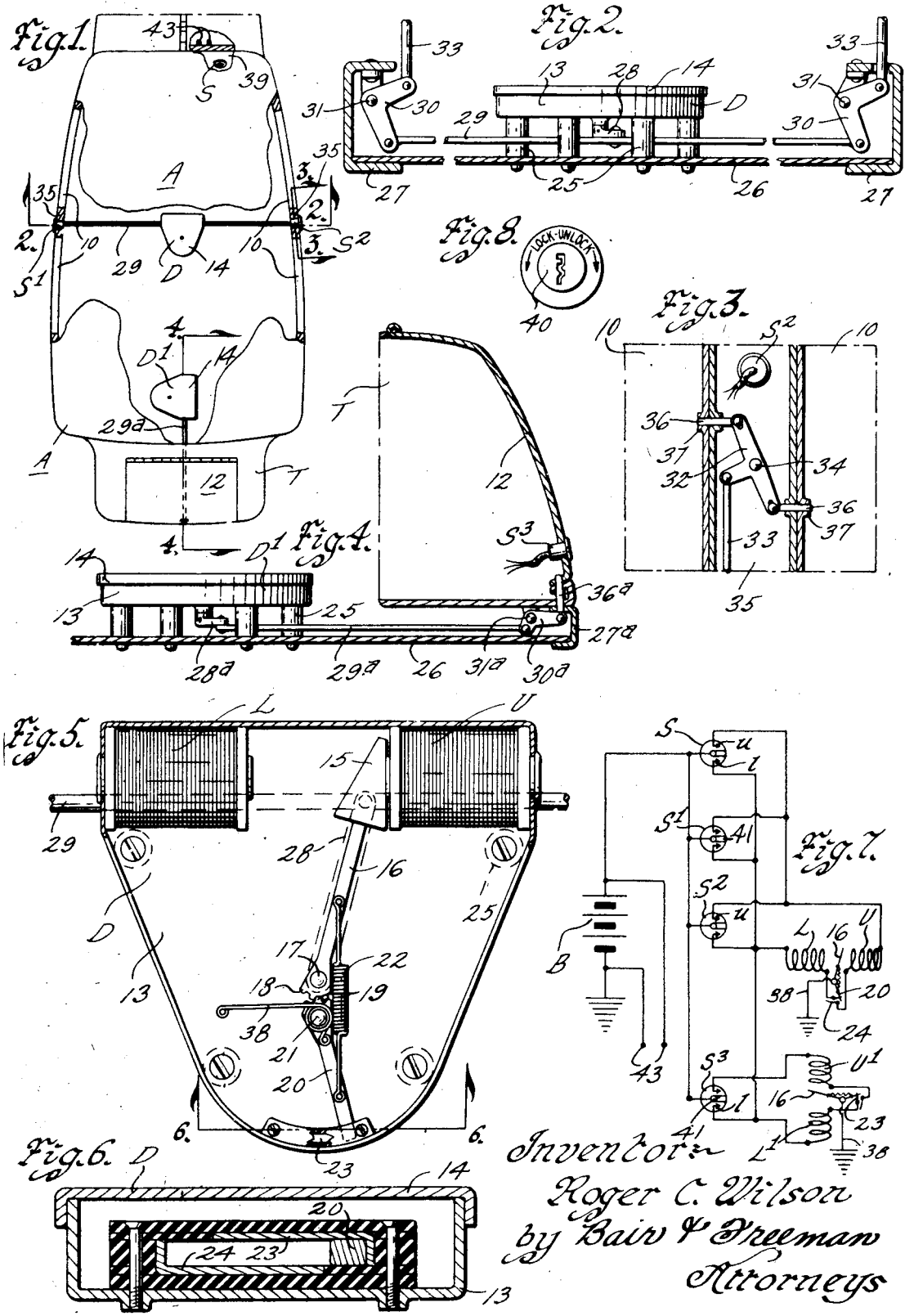

2,158,451

UNITED STATES PATENT OFFICE 2,158,451

LOCK SYSTEM FOR AUTOMOBILES AND THE LIKE

Roger C. Wilson, Alta, Iowa

Application May 9, 1938, Serial No. 206,810

10 Claims. (Cl. 70—264)

One object of my invention is to provide a lock system for automobiles and the like which is simple, durable and comparatively inexpensive to manufacture.

A further object is to provide a locking system which makes it possible to unlock all of the doors of an automobile from either side or the inside thereof and to accomplish such unlocking of the doors simultaneously.

A further object is to provide locking means for the lid or door of an automobile trunk which is preferably operated by a separate locking device so connected in an electric circuit with the locking device for the automobile body doors that body and trunk doors will be locked simultaneously but can be unlocked independently of each other.

More particularly it is my object to provide an electrically operated lock system for an automobile including a locking device having locking and unlocking coils, key-operated switches being utilized for the purpose of energizing the coils selectively for locking and unlocking purposes.

A further object is to provide circuit connections from the car battery to the locking and unlocking coils and controlled by a plurality of key-operated switches, one of which is preferably mounted in the driver's compartment and the others mounted adjacent the doors.

With these and other objects in view, my invention consists in the construction, arrangement and combination of the various parts of my system whereby the objects contemplated are attained, as hereinafter more fully set forth, pointed out in my claims and illustrated in the accompanying drawing, in which:

Figure 1 is a semi-diagrammatic plan view of an automobile with my lock system applied thereto.

Figure 2 is an enlarged sectional view on the line 2—2 of Figure 1 showing the locking device for the body doors of the automobile.

Figure 3 is an enlarged sectional view on the line 3—3 of Figure 1 showing further details of the locking mechanism for the body doors.

Figure 4 is an enlarged sectional view on the line 4—4 of Figure 1 showing the locking device and associated mechanism for the trunk of the automobile.

Figure 5 is an enlarged plan view partly in section of the locking device shown in Figure 2 with the cover removed therefrom to illustrate constructional details of the device.

Figure 6 is an enlarged sectional view on the line 6—6 of Figure 5 showing an automatic switch mechanism used in my system to prevent prolonged energization of the locking or unlocking coils.

Figure 7 is an electro-diagrammatic view of my lock system for automobiles and the like; and Figure 8 is an outside elevation of a key-operated switch used in connection with my system.

On the accompanying drawing I have used the reference character A to indicate generally an automobile. The automobile A has a trunk T, a plurality of body doors 10 and a trunk door 12. Locking devices D and $D^1$ are provided for locking the doors 10 and 12 respectively. Each locking device comprises a casing 13 having a cover 14. Within the casing, locking and unlocking coils L and U, respectively, are mounted. These are adapted, as obvious from an inspection of Figure 5 to attract an armature 15 either toward the right or toward the left depending upon whether the unlocking coil or the locking coil is energized.

The armature 15 is carried by an arm 16 secured to a shaft 17. The shaft is oscillatably mounted in the casing 13 and has gear teeth 18 meshing with gear teeth 19 of a switch arm 20. The switch arm 20 is pivoted on a stud 21 and the arms 16 and 20 are connected together by a toggle or overcenter spring 22.

The switch arm 20 is adapted to contact in its opposite positions with a locking coil contact plate 23 and an unlocking coil contact plate 24, the purpose of which will hereinafter appear.

The locking devices D and $D^1$ are suitably mounted relative to the automobile A as by supporting posts 25 secured to the bottom plate 26 now usually provided in automobiles to seal the chassis against entrance of dirt and the like to the machinery of the automobile. Portions of the chassis frame are shown in Figures 2 and 4 at 27 and 27a. The bottom plate 26 effectively prevents unauthorized tampering with the locking devices D and $D^1$.

The locking device D has an operating arm 28 secured to the shaft 17 thereof and connected by a link 29 with bell crank levers 30. These are pivoted as at 31 (see Figure 2) and operate T-shaped bell cranks 32 shown in Figure 3 through link connections 33. The bell cranks 32 are pivoted as at 34 within the jamb members 35 between the doors 10 of the automobile and are operatively connected with locking pins 36 extending into perforated bosses 37 of the doors 10 as shown in Figure 3 for thus locking the doors against being opened, Figures 2, 5 and 6 however showing the parts in unlocking position. By providing two of the bell cranks 30 as shown in Figure 2 on opposite sides of the automobile, and one of the arrangements shown in Figure 3 for each of said opposite sides thereof, the single locking device D may be utilized for locking all four doors of the automobile.

The locking device D¹ has a similar operating arm 28a connected by a link 29a to a bell crank 30a. The bell crank 30a operates a locking pin 36a for a trunk door 38 as shown in Figure 4.

A plurality of single pole, double-throw switches S, S¹, S² and S³ are provided for my lock system. The switch S is located preferably in the driver's compartment as on the dash 39 thereof as shown in Figure 1. The switches S¹ and S² are located in the door jambs 35 while the switch S³ is located in the trunk door 38. The switches S, S¹ and S³ are connected in the circuit of the car battery B as shown in Figure 7. Each switch has an unlocking contact u and a locking contact l. Each switch also has a key plug 40 as shown in Figure 8 which carries a switch blade 41 as shown diagrammatically in Figure 7. Rotation of the plug is possible only when the proper key is inserted therein, whereupon the switch blade 41 can be swung to contact with either the unlocking contact u or the locking contact l. Each of the locking contacts l are connected with the locking coils L and L¹ of the locking devices D and D¹.

The switches S, S¹ and S² have their unlocking contacts u connected with the unlocking coil L of the locking device D only while the unlocking contact u of the switch S³ is connected with the unlocking coil U¹ of the locking device D¹. By this arrangement the operation of any one of the switches to locking position will cause all the doors 10 and 12 to be locked while the unlocking of the body and trunk doors must be performed independently. In this way the operator of the automobile is always insured that his trunk will be locked even though the body doors are unlocked and the trunk can be unlocked only when turning the plug of the lock S³ in the "unlock" direction.

To avoid any possibility of a loose electrical connection with the pivoted switch arm 20, I provide a coiled spring connection 38. The switch arm, adjacent the end of its throw in either direction, will leave either the switch plate 23 or the switch plate 24 for thus de-energizing the coil that has been energized to effect movement of the armature 15 from one of its positions to the other. The completion of the throw is effected by centrifugal force aided by the toggle spring 22. The toggle spring also prevents any movement of the locking devices D and D¹ from locked or unlocked positions after such positions are assumed except by proper energization of the coils. In this way the coils are energized only momentarily and there is therefore no possibility of running the battery B down or overheating the coils by leaving the key in the lock. The lock of course must be returned to its neutral position before the key can be taken out so that the switch blade 41 is always certain to be in its neutral position when the key is removed. In the event that the battery B should become discharged due to any cause, the operator can connect another battery as to the terminals 43 mounted under the hood of the automobile so as to permit him to unlock the doors even though the car battery is dead. Mere connection from the battery to the terminals 43 is obviously insufficient to unlock the doors as in addition to this, one of the switches must be properly operated by insertion and turning of the proper key.

My system provides a very handy and readily operable locking means for the doors of an automobile so that the operator is always insured that all doors are locked or unlocked as desired. He is also insured that the trunk will be locked whenever the doors are locked and will not be unlocked when the body doors are unlocked except by a separate operation of the switch S³ when it is desirable to gain access to the trunk.

Some changes may be made in the construction and arrangement of the parts of my lock system without departing from the real spirit and purpose of my invention and it is my intention to cover by my claims any modified forms of structure or use of mechanical equivalents which may be reasonably included within their scope.

I claim as my invention:

1. In a locking system for automobiles and the like having a plurality of doors; lock means therefor comprising an electrically operated locking device for all of said doors and a plurality of key-operated switches connected in circuit therewith to selectively operate said locking device to locked or unlocked positions.

2. In a lock system for automobiles and the like having a plurality of doors; lock means therefor comprising a pair of electrically-operated locking devices, one for one of said doors and the other for the remaining doors and a key-operated switch connected in circuit with said locking devices to simultaneously operate them to locked position and separately operate them to unlocked position.

3. In a locking system for a plurality of automobile body and trunk doors; locking means comprising an electrically-operated device for said body doors and a second electrically-operated device for said trunk door and a key-operated switch for each of said doors and in circuit with said locking devices to simultaneously render each operable to lock its door or render them operable to unlock said doors.

4. In a locking system of the character described for a plurality of automobile doors; locking means for said doors and means to lock and unlock said locking means comprising locking and unlocking coils, an armature to be swung in opposite directions by said coils and operatively connected with said locking means, an overcenter spring to retain said armature in locked or unlocked positions after the locking or unlocking coil has been momentarily energized and a plurality of key-operated switches, one of which is in the driver's compartment of the automobile, for energizing said coils.

5. In a locking system of the character described for a plurality of automobile doors; locking means for said doors and means to lock and unlock said locking means comprising locking and unlocking coils, an armature to be swung in opposite directions by said coils and operatively connected with said locking means, an overcenter spring to retain said armature in locked or unlocked positions after the locking or unlocking coil has been momentarily energized and a plurality of key-operated switches, one of which is in the driver's compartment of the automobile, for energizing said coils, and switch means to deenergize either coil after it has been energized sufficiently long enough to swing said armature from one of its positions to the other of its positions.

6. In a locking system of the character described for a plurality of doors for the body of an automobile and a door for the trunk thereof; locking means for said doors comprising a pair of electrically-operated devices for the body doors and the trunk doors respectively, said locking devices being electrically operated, a key-operated switch for the body doors and a key-operated switch for the trunk door, said switches being in circuit with said locking devices to render both locking devices operable to lock their doors or to render them separately operable to unlock their doors.

7. In locking means of the character described for a plurality of automobile doors; locking means for said doors and means to lock and unlock said locking means comprising locking and unlocking coils, an armature to be swung in opposite directions by said coils and operatively connected to said locking means, an overcenter spring to retain said armature in locked or unlocked positions after the locking or unlocking coil has been momentarily energized and a plurality of key-operated switches for energizing said coils.

8. In a locking system of the character described for a plurality of doors for the body of an automobile and a door for the trunk thereof, locking means for said doors comprising a pair of electrically-operated devices for the body doors and the trunk door respectively, said locking devices being electrically-operated, a key-operated switch for said body doors, a second key-operated switch for said trunk door, said switches being in circuit with said locking devices to render both locking devices operable to lock their doors or to render them separately operable to unlock their doors, each of said locking devices including an armature to be swung in opposite directions, locking and unlocking coils to actuate said armature to either its locked or unlocked positions and toggle means to retain the armature in its new position after the locking or unlocking coil therefor has been momentarily energized.

9. In a locking system of the character described for a plurality of doors for the body of an automobile and a door for the trunk thereof; locking means for said doors comprising a pair of electrically-operated devices for the body doors and the trunk door respectively, said locking devices being electrically-operated, a key-operated switch for said body doors and a key-operated switch for said trunk door, said switches being in circuit with said locking devices to render them operable to lock their doors or to render them operable to unlock their doors, said locking devices including armatures to be swung in opposite directions and locking and unlocking coils to effect such swinging.

10. A locking system of the character described for a plurality of doors for the body of an automobile and a door for the trunk thereof comprising of locking means for said doors comprising a pair of electrically-operated devices for the body doors and the trunk door respectively, said locking devices being electrically-operated key-operated switches for said body doors and a key-operated switch for said trunk door, said switches being in circuit with said locking devices to render them operable to lock their doors or to render them operable to unlock their doors, said locking devices including armatures to be swung in opposite directions, locking and unlocking coils to effect such swinging and circuit control means to de-energize said coils after momentary energization thereof.

ROGER C. WILSON.